May 25, 1937.  J. WRIGHT ET AL  2,081,443
FLUID PRESSURE BRAKING APPARATUS
Filed Jan. 26, 1937   2 Sheets-Sheet 2
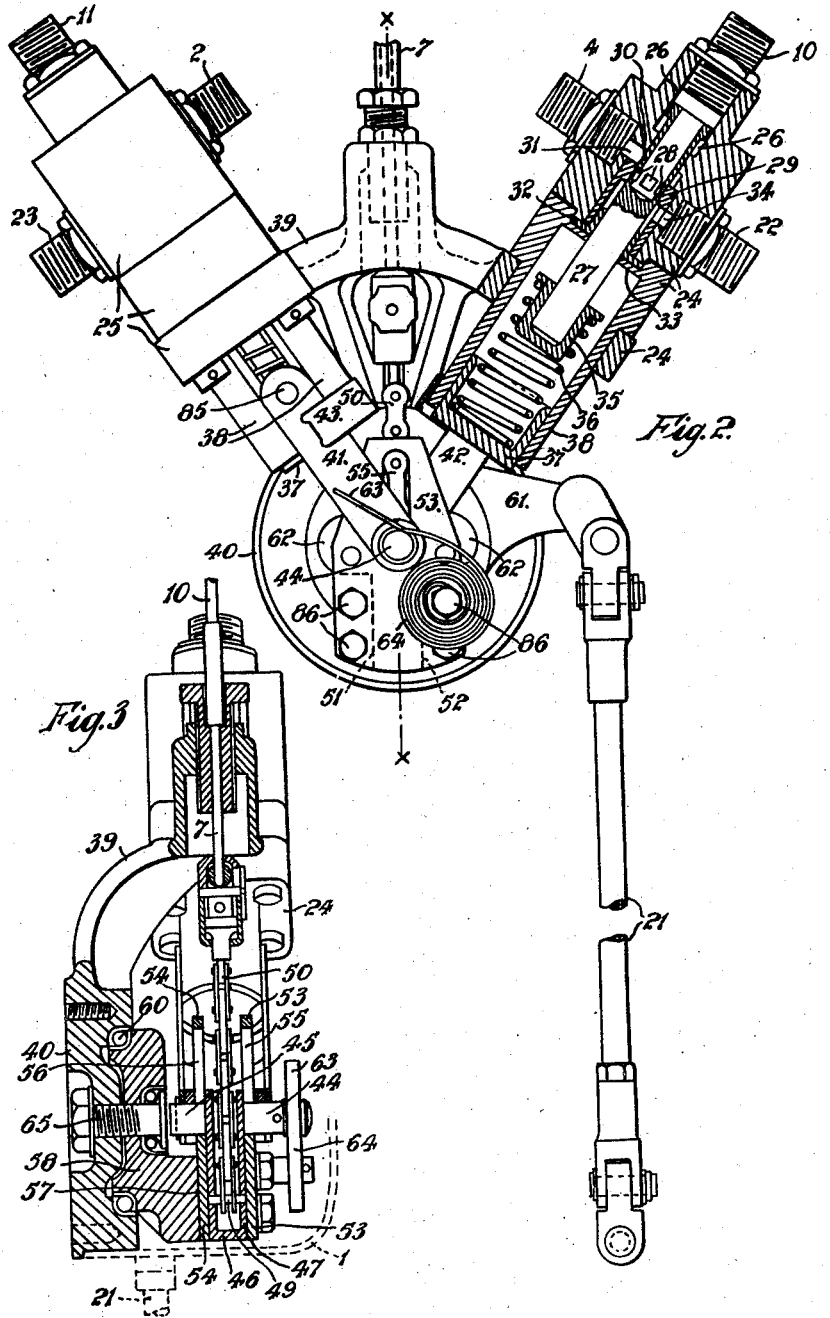

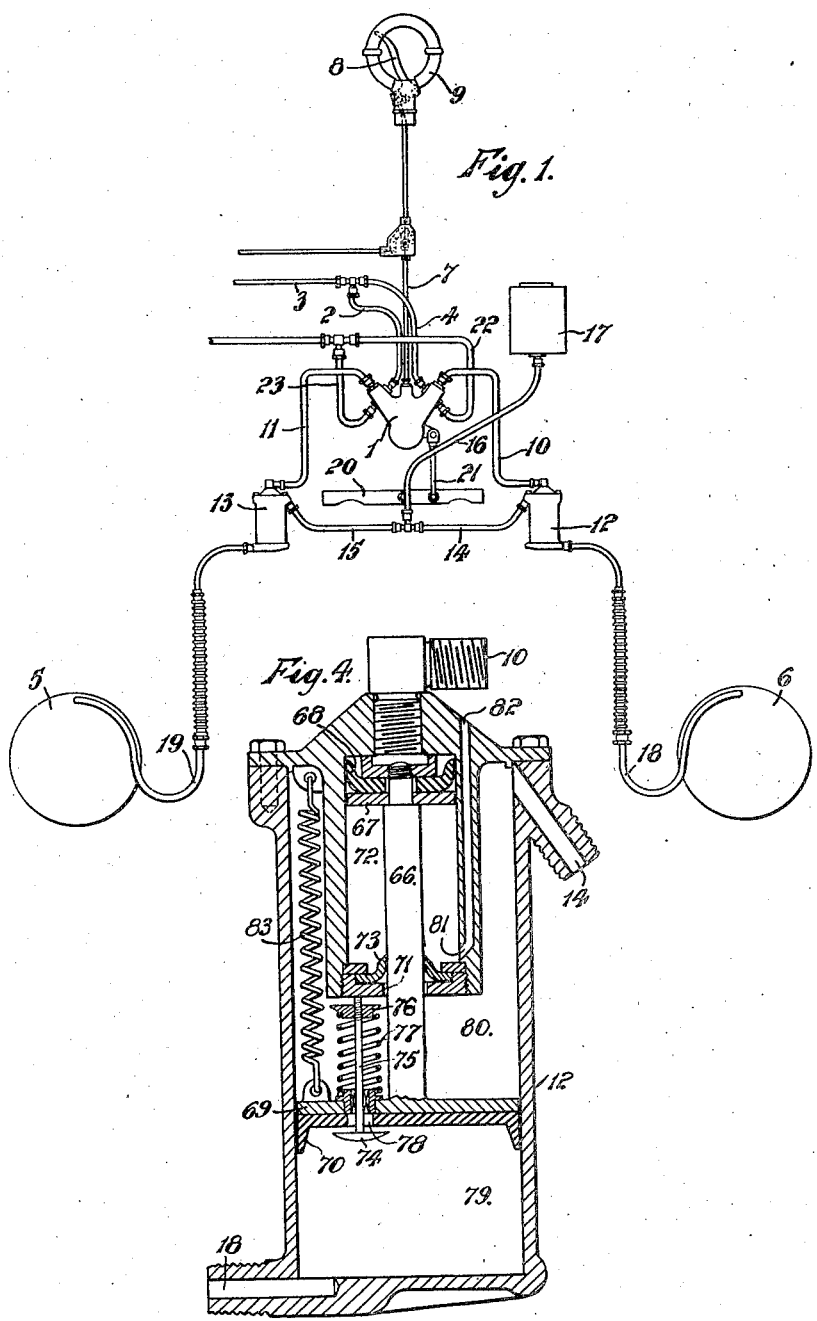

Patented May 25, 1937

2,081,443

UNITED STATES PATENT OFFICE 2,081,443

FLUID PRESSURE BRAKING APPARATUS

Joseph Wright, Stoke Park, and Henry Trevaskis, Sutton Coldfield, England, assignors to Dunlop Rubber Company, Limited, London, England, a British company Application January 26, 1937, Serial No. 122,362
In Great Britain February 19, 1936

9 Claims. (Cl. 303—6)

Our invention relates to a fluid pressure operated braking and steering apparatus and particularly to apparatus for braking and steering aircraft. In our invention, upon the operation of an actuating or control device, fluid under pressure is admitted to the brake applying system until a pressure is built up in the latter corresponding to the position of the control mechanism, whereupon further admission of pressure fluid is interrupted. Accordingly, the pressure applied to the brakes is readily responsive to and proportional to the movement of the control or actuating lever or element. Upon release or return of the control element, fluid is released from the brake applying mechanism. In steering, as well as applying the brakes to vehicles, such as aircraft, a pair of control mechanisms are so arranged, one for each respective brake applying mechanism, and connected to the steering or rudder bar that the movement of the control element will be so distributed by a tilting or movement of the rudder bar as to build up a greater pressure on one braking system than on the other.

For example, a greater braking pressure or effort would be imparted to the wheel turning on the shorter radius of curvature. The braking system may also be provided with a transformer, whereby the pressure may be reduced while at the same time always in direct proportion to the pressure established by the control mechanism.

In the preferred embodiment of the invention, the pressure control mechanism comprises a pressure reducing valve having inlet and return ports entering at longitudinally displaced positions in a piston bore or cylinder. A piston having one end hollowed is so provided with ports that in one position these ports register with the fluid supply port, admitting fluid to the piston and bore and thence to the brake applying system, in another position communicating with the return pipe and thus admitting fluid from the braking system to a return pipe and thus releasing the braking pressure and in an intermediate position between the inlet and return ports and thus closing the braking system from both supply and return ports and sealing it against change of pressure. In brake release position, the piston ports are aligned with the return ports and the braking system is free of pressure. The piston is displaceable through a spring to such position as to place the piston ports in communication with the supply ports, thus admitting pressure fluid to the piston cylinder or bore until the pressure builds up sufficiently to compress the spring and move the piston to intermediate position, where the fluid pressure balances the spring pressure.

The spring is actuated by a control mechanism, so that with each proportioned movement of the control mechanism, the spring moves the piston to fluid admitting position until a proportioned pressure is built up or reversely opens the piston bar or cylinder to the return pipe until the pressure falls proportionately or to zero.

The pressure supplied from the valve cylinder or bore may be admitted to displace a small piston, which in turn may displace a piston of larger diameter, which delivers fluid directly to the braking apparatus. In this case, the pressure transformed to the braking apparatus is lower than that supplied from the control valve, but greater in quantity. Two pressure control valves may be controlled from a single control apparatus through a mechanism controlled by the rudder bar to distribute the displacement of the control mechanism to the pressure control valves in a definite relation to the position of the rudder bar.

The various features of the invention are illustrated by way of example in the accompanying drawings, in which—

Fig. 1 is a general diagram of the apparatus as connected to an aircraft brake system; Fig. 2 is a part sectional plan view of the apparatus within the casing 1 of Fig. 1; Fig. 3 is a part sectional side elevation on the line X X of Fig. 2; Fig. 4 is a sectional elevation of one of the step down transformers 12, 13 of Fig. 1. In the general arrangement shown in Fig. 1, liquid such as mineral oil under pressure is supplied to the apparatus casing 1 by inlet pipes 2, 4 joined to a common inlet pipe 3 and liquid exhausted from the apparatus returns through return pipes 22, 23 which may be connected together to a suitable reservoir from which the pump derives its supply. The pump and reservoir are not shown as these may be of any suitable type, the former being preferably driven by the engine of the aircraft.

The pressure inlet pipes 2, 4 are each connected to one of the dual reduction valves of the apparatus. The pressure transmitted from the apparatus to each of the brakes or groups of brakes 5 and 6 controlled by a cable 7 operated for instance by a finger lever 8 pivoted to the chief flying control 9.

The pressure fluid released from the apparatus 1 by operation of the finger lever 9 passes through two outlet pipes 10 and 11, which are connected respectively to the high pressure side of two step down pressure transformers 12 and 13.

The low pressure side of each of the transformers 12 and 13 is preferably filled with a liquid such as vegetable oil permitting the use of distensible rubber annuli to operate the brake mechanisms in the wheels without adverse effect upon the rubber portions of such distensible annuli by the oil within it.

The low pressure sides of each of these transformers is maintained full of vegetable oil by feed pipes 14 and 15 connected by a feed pipe 16 to a transformer reservoir 17 and the reduced pressures are transmitted to the wheels 5 and 6 by brake pipes 18 and 19.

It will be understood that, if desired, the pipes 10 and 11 may be connected directly to the wheel mechanisms or through suitable non-return valves capable of operation to retain the pressures applied to the brakes.

The brake pipes 18 and 19 in the arrangement shown may also be interrupted by non-return valves, if desired, to retain the pressures applied to the brakes for holding the aircraft stationary while unattended or prior to flight.

In the arrangement shown above, equalized pressure is applied to the wheel brakes by operation of the finger lever 8 and differential pressure is applied by operating the rudder bar 20 connected to the apparatus 1 by a link 21 as will be understood from the following and more detailed description of the invention.

On release of the brakes, the pressure fluid returns to the reservoir or pump through the return pipes 22, 23. Within the casing 1, Fig. 1, is a pair of reducing valves of identical construction, which have hollow stationary housing portions 24, 25, Fig. 2, each of which has a tubular bore 26 containing a movable valve part in the form of a hollow piston 27 having four piston ports 28 of square shape formed in the wall of the piston at its hollow end 30.

The output pipe 10 from the valve housing 24 is connected to the end of the hollow bore 26 containing the piston 27, the other output pipe 11 being similarly connected to the other valve casing 25.

The return pipes 22, 23 are connected to return ports, one of which is shown at 34, Fig. 2. In the inoperative position shown in Fig. 2, the inlet port 31 and the return port formed at 34 in the stepped sleeve 29 are respectively sealed by the cylindrical wall of the piston 27 and by its hollow portion 30, since the piston ports 28 lie between the inlet and outlet ports 31 and 34 and in contact with the lesser diameter portion of the stepped sleeve 29 which lines a portion of the bore 26.

The body of the piston 27 passes through a flanged sealing washer 32 of rubber or other suitable material, the flange of which washer is supported upon an apertured web 33 formed within the valve casing 24, and this washer serves to prevent leakage of oil past the piston and is positioned between the web 33 and one end of the stepped sleeve 29.

The inner end of the piston 27 seats in a flanged cup 35, the flange of which is an abutment for a coil spring 36. The other end of the spring 36 abuts upon the inner flat surface of a second cup 37, which slides between two plates 38 of curved section extending inwards from the respective valve housings 24, 25. These housings are united by an arcuate bridge 39 cast integral with the base 40 of the unit shown in Figs. 2 and 3.

Reciprocatory movement is imparted to each of the cups 37 through a plurality of members movable along or at an angle to the axes of the pistons. These members comprise two pairs of vertically spaced links 41, 42 which are connected to each of the cups 37.

The left hand side of the drawing shown in Fig. 2 shows only the upper link 41 of the two links 41 on that side, the other link 41 being concealed beneath the upper link 41 shown in the drawings. The right hand sectioned portion shows only the under link 42, the fellow upper link to which is omitted in the sectional portion of Fig. 2.

The cup contacting surfaces at the outer ends of each of these links are provided with studs 85 seated in recesses in the cups 37 and maintained in spring pressed engagement therewith by spring clips one of which is shown at 43.

The converging ends of these links are apertured in register and through the apertures in the upper pair passes a spindle 44, Figs. 2 and 3, beneath which spindle, but spaced therefrom, is a second spindle 45, Fig. 3. The adjacent ends of the spindles 44, 45, Fig. 3, which are coaxial, are respectively secured to two plates 46, 47, Fig. 3, themselves spaced apart by a connecting web 48 and by an abutment 49, Fig. 3, to which is connected a chain 50 itself connected to the cable 7, which is tensioned by the finger lever on the joy stick and passes through the central portion of the curved bridge piece connecting the valve housings.

The edges of the plates 46, 47 connected by the web 48 are contacted by the edges of a pair of spacing blocks 51, 52 shown by dotted lines in Fig. 2 and secured to the flat surfaces of these blocks are a pair of vertically spaced tongue shaped guide plates 53, 54, in which are slots 55, 56, each serving to guide one of the spindles 44, 45.

The tongue shaped slotted guide plates 53, 54 are secured by studs 86 to the spacing blocks 51, 52, and also to the stepped portion 57 of a member 58, which is rotatably located on ball bearings 59 and 60, Fig. 3, around a bolt 65 passing through the centre of the base 40.

Extending integrally from the rotatable member 58 is an arm 61, to which is attached a link 21, itself connected to the rudder bar 20, Fig. 1.

Between the tongue shaped slotted guide plates 53 and 54, Fig. 1, and on either side of the chain 50 is positioned a pair of rollers 62, which sustain the side thrust of the chain and maintain its tension when the rotatable member 58 and the various guide plates attached to it are rotated by movement of the rudder bar.

A spiral spring 64 having a tail 63 is positioned on the slotted plate 53, so that the tail contacts the spindle 44 and assists the valve mechanism to return to the initial position.

In the normal inoperative position shown in Fig. 2, it will be seen that the axes of the respective pistons, their actuating springs 36, and links 41, 42, converge upon the vertical axes of the coaxial spindles 44, 45, and that the chain 50 and guide slots 53, 55 coincide with a line bisecting the angle between the axes of the pistons.

The step down hydraulic transformers 12, 13 are identical in construction and their construction is shown in section in Fig. 4, wherein the transformer 12 is connected to the outlet pipe 10 of the apparatus described above, to the feed pipe 14 of the transformer reservoir, and to the brake pipe 18.

Within each transformer, which is of cylindrical form, is a piston rod 66 at the upper end of which is a small diameter piston 67 faced with a flanged leather washer 68 and at the lower end a large diameter piston 69 faced with a flanged rubber washer 70.

The piston rod 66 passes through an aperture 71 in a small diameter chamber 72 containing mineral oil, the aperture 71 being yieldingly sealed by a leather washer 73.

Positioned between the wall of the small diameter chamber 72 and the larger piston 69 is a mushroom valve 74 having a stem 75, to which is secured an abutment 76 loaded by a compression spring 77 tending normally to press the end of the valve stem against the end wall of the small diameter chamber 72 adjacent the aperture 71 so that in the inoperative position shown, the valve 74 leaves its aperture 78 open to ensure that the larger diameter chamber 79 below the larger piston 69 is full of vegetable oil gravity feed through the intermediate chamber 80 by the pipe 14 connected to the reservoir 17, Fig. 1.

Provision for the escape of air trapped in the chamber 72 consists of a channel 81 leading from the base of the small diameter chamber 72 to a vent hole 82 formed in the upper end of the casing of the transformer.

The larger piston 69 is also connected to the upper end of the transformer by a plurality of tension springs, one of which is shown at 83, which serve to raise the larger piston, when the brakes are released and maintain the contact of the end of the valve stem 75, with the base of the chamber 72, which is thereby kept filled while the brakes are not applied. The operation of the apparatus is as follows:—

In the position shown in the drawings, the finger lever 8 is in the inoperative position, and in consequence no tension is applied to the cable 7 and chain 50. The springs 36 connected to the valve pistons 27 are not compressed and the pistons 27 and their hollow ends 30 prevent the entry of liquid under pressure from the pipes 2 and 4 into the transformer 12, 13.

The double ended pistons of each of transformers in consequence occupy the positions shown in 4 with the valves 74 displaced to ensure that the larger diameter chambers 79 are full of oil supplied by the gravity reservoir 17.

To apply the brakes equally, the pilot moves the finger lever 8 from left to right, thereby pulling the cable 8 and the chain 50 attached at its other end to the abutment 48, Fig. 3, connected to the plates 46, 47. Since the rudder bar is undeflected, the plates 46, 47 then move along the axis X X guided between the spacing blocks 51, 52, Fig. 2, and carrying with them the two spindles 44, 45, Fig. 3.

The links 41, 42 connected to the spindles, 44, 45, transmit the movement to the valve springs 36, which are compressed causing the square ports 28 in the hollow ends 30 of the pistons 27 to enter into register with the inlet ports 31.

Mineral oil under pressure supplied by the inlet pipes 2 and 4 then flows through the inlet ports 31 through the piston ports 28 and out to the transformers and/or brakes through the pipes 10 and 11 until the hydraulic pressure on the hollow ends 30 of the pistons 27 equals the pressure on the opposite ends of the pistons due to the degree to which the springs 36 are compressed.

When the liquid under pressure is admitted through the inlet port 31 and square ports 28, the hollow bore 26 portion of each valve is filled with fluid which surrounds the piston so that friction due to side thrust is eliminated and the piston is subjected only to axial hydraulic pressure, upon its hollow end.

The liquid under pressure released from the threaded outlet portions 29 passes to each of the outlet pipes 10, 11 connected to the transformers 12, 13. The liquid so released from the dual valve apparatus exerts equal pressures on each of the smaller pistons 67 of the transformers, thereby causing the descent of the larger pistons 69.

The initial downward movement of the greater diameter pistons 69 carries the spring loaded stem 75 of the mushroom valve 74 out of contact with the base of the chamber 72, so that the mushroom head of the valve 74 rises to seal the aperture 78 and continued pressure exerted by the smaller diameter piston on the larger diameter piston expels vegetable oil at reduced pressure to operate the brakes through the pipes 18, 19.

On releasing the finger lever 8 which may, if desired, be provided with a pawl and ratchet to retain the pressure temporarily, the vegetable oil expelled from the larger diameter chamber 79 into the brake mechanisms 5 and 6 is returned therefrom and the double ended piston rod 66 rises with its two pistons under the influence of the spring 83 to the initial position in which the mushroom valve 74 is again displaced as shown to permit the return of any excess vegetable oil to the gravity reservoir 17.

To apply the brakes with unequal pressure as for instance to turn the vehicle to the left, the pilot applies his right foot to the rudder bar 20, thereby causing the link 21 to move towards the dual valves and imparting rotation in an anti-clockwise direction to the rotatable member 58 and to the two slotted tongue shaped guide plates 53, 54.

The finger lever 8 will usually have just been operated to apply the brakes equally after the first contact with the ground and the effect of now deflecting the rudder bar, as described above is to deflect the guide slots 55, 56 from coincidence with the line X X to a line at an angle thereto, thereby advancing the links 41 and retracting the links 42 with the result that the brakes are applied more heavily on the left hand side than on the right hand side, and the vehicle swings round to the left.

It will be understood that deflection of the rudder bar alone permits steering without operating the brakes, since the spindles 44, 45 are coincident with the axis of rotation of the rotatable member 58, and that the application of the brakes equally necessitates only the operation of the finger lever 8, while the application of unequal pressure requires the operation of both rudder bar and the finger control.

Having now described our invention, we claim—

1. A control mechanism for hydraulic braking apparatus which comprises a valve having a supply and a return port longitudinally spaced from each other, a piston, slidable in said valve, hollowed at one end and having ports registering alternatively with said supply and return ports in alternative positions of longitudinal displacement and closed from said ports in an intermediate position, a spring acting on said piston and control means to compress or release said spring against said piston.

2. A control mechanism for hydraulic braking apparatus which comprises a valve having a supply and a return port longitudinally spaced from each other, a piston, slidable in said valve, hollowed at one end and having ports registering alternatively with said supply and return ports in alternative positions of longitudinal displacement and closed from said ports in an intermediate position, a spring acting on said piston and control means to compress or release said spring against said piston and an outlet from the end of said valve communicating with the hollowed part of said piston.

3. Braking and steering apparatus for aircraft and the like, which comprises a pair of control valves, each having a piston hollow at one end, and said cylinder having supply and return ports at longitudinally displaced positions, said hollowed part of said piston having ports to register with said supply and return ports at extreme displacements of said piston and to be sealed from said ports in intermediate position, a control actuating mechanism comprising a pair of springs respectively for said valves between said actuating mechanism and said piston, a steering mechanism and means actuated thereby to proportion the compression of said springs to the position of said steering mechanism.

4. A control mechanism for hydraulic braking apparatus, which comprises a pair of cylinders, each having a supply port and a return port in relatively longitudinally displaced positions, a pair of valves one for each cylinder having a valve port and slidable longitudinally in its respective cylinder to bring said valve port into communication alternatively with said supply port or said return port and into intermediate position out of communication with either port, means to displace said valves from communication with their respective return ports to communication with their respective supply ports, said means comprising a pair of displaceable elements and springs between said displaceable elements and the respective valves of said cylinders.

5. A control mechanism for hydraulic braking apparatus which comprises a cylinder having a supply port and a return port at relatively longitudinally displaced positions, a valve having a valve port and slidable longitudinally in said cylinder to bring said port alternatively into communication with said supply port or said return port and into intermediate position out of communication with either valve, said valve having an opening from said port toward one end of said cylinder and said cylinder having a supply port in said end and resiliently acting means to force said valve under a variable pressure from communication with said return port to communication with said supply port.

6. A control mechanism for hydraulic braking apparatus which comprises a pair of cylinders each having a supply port and a return port at longitudinally displaced relative positions in said cylinder, a pair of valves one for each cylinder, each having a valve port and slidable longitudinally in said cylinder to bring said port into communication alternatively with said supply port or said return port and into intermediate position out of communication with either valve, said valve being open from said valve port to one end of said cylinder and said cylinder having an outlet pipe from said end, resiliently acting means to displace said valve under variable pressure from communication with said return port to communication with said supply port.

7. A control mechanism for hydraulic braking apparatus which comprises a pair of cylinders each having a supply port and a return port at longitudinally displaced relative positions in said cylinder, a pair of valves one for each cylinder, each having a valve port and slidable longitudinally in said cylinder to bring said port into communication alternatively with said supply port or said return port and into intermediate position out of communication with either valve, said valve being open from said valve port to one end of said cylinder and said cylinder having an outlet pipe from said end, resiliently acting means to displace said valve under variable pressure from communication with said return port to communication with said supply port, a steering mechanism and means controlled by said steering mechanism to apportion the displacement of said resiliently acting means.

8. A control mechanism for hydraulic braking apparatus which comprises a pair of cylinders each having a supply port and a return port at longitudinally displaced relative positions in said cylinder, a pair of valves one for each cylinder, each having a valve port and slidable longitudinally in said cylinder to bring said port into communication alternatively with said supply port or said return port and into intermediate position out of communication with either valve, said valve being open from said valve port to one end of said cylinder and said cylinder having an outlet pipe from said end, resiliently acting means to displace said valve under variable pressure from communication with said return port to communication with said supply port, a turning element having guides, a pin slidable in said guide from the axis of turning, means connecting said pins to said valve displacing means and a steering means for rotating said turning element and guide to apportion the displacement between said valves.

9. A control mechanism for hydraulic braking apparatus which comprises a valve cylinder having a supply port and a return port at relatively longitudinally displaced positions, a valve in said cylinder and an outlet pipe from one end thereof, a valve slidable in said cylinder and having a port communicating with said outlet pipe and communicating with said return and said supply ports alternatively in positions of maximum displacement and in intermediate positions closed from said return and supply ports, means to displace said valve and a hydraulic transformer having a small piston acted upon by fluid from said outlet pipe and a piston of a larger area driven by said smaller piston.

JOSEPH WRIGHT.
HENRY TREVASKIS.